United States Patent
Durand et al.

(10) Patent No.: US 7,959,512 B2
(45) Date of Patent: Jun. 14, 2011

(54) FLEXIBLE DISK, A FLEXIBLE COUPLING PROVIDED WITH SUCH A FLEXIBLE DISK, A MOUNTING FLANGE PROVIDED WITH SUCH A FLEXIBLE COUPLING, AND A TRANSMISSION SHAFT FITTED WITH SUCH A MOUNTING FLANGE

(75) Inventors: Philippe Jacques Durand, Berre l'Etang (FR); Benjamin Kerdreux, Toulon (FR)

(73) Assignee: Eurocopter, Marignane Cedex (FR)

( * ) Notice: Subject to any disclaimer, the term of this patent is extended or adjusted under 35 U.S.C. 154(b) by 475 days.

(21) Appl. No.: 12/177,897

(22) Filed: Jul. 23, 2008

(65) Prior Publication Data
US 2009/0029782 A1   Jan. 29, 2009

(30) Foreign Application Priority Data
Jul. 25, 2007   (FR) ..................... 07 05433

(51) Int. Cl.
*F16D 3/00* (2006.01)
*F16D 3/77* (2006.01)
(52) U.S. Cl. ............... 464/99; 464/98; 29/428
(58) Field of Classification Search ........... 464/51, 464/79, 92, 98, 99, 147; 29/428
See application file for complete search history.

(56) References Cited

U.S. PATENT DOCUMENTS

| | | | | |
|---|---|---|---|---|
| 2,647,380 A | * | 8/1953 | Henry et al. | 464/99 |
| 2,883,839 A | * | 4/1959 | Henry et al. | 464/99 |
| 3,124,942 A | * | 3/1964 | Rothfuss et al. | 464/99 |
| 4,044,571 A | * | 8/1977 | Wildhaber | 464/91 |
| 4,079,598 A | * | 3/1978 | Wildhaber | 464/91 |
| 4,133,187 A | * | 1/1979 | Wildhaber | 464/91 |
| 4,133,188 A | * | 1/1979 | Cartwright | 464/99 |
| 5,158,504 A | | 10/1992 | Stocco | |
| 5,899,813 A | * | 5/1999 | Bunce | 464/99 |
| 2007/0049379 A1 | * | 3/2007 | Faass et al. | 464/79 |

FOREIGN PATENT DOCUMENTS
FR   1 020 765   2/1953
WO   97/48914   12/1997

* cited by examiner

*Primary Examiner* — Greg Binda
*Assistant Examiner* — Josh Skroupa
(74) *Attorney, Agent, or Firm* — Brooks Kushman P.C.

(57) ABSTRACT

A flexible disk for connecting a transmission shaft to rotate with a mechanical part, the flexible disk being suitable for forming rotary motion about an axis of rotation and including in succession going from its center towards its periphery an empty central zone, a circular base, a transition zone having an outer face and an inner face, and then a peripheral collar. The transition zone presents a minimum thickness at the edge of the peripheral collar, the minimum thickness being determined with the help of the following thickness relationship in which "e" represents the thickness of the transition zone at a first distance "r" from the axis of rotation, "Q" is a constant that depends on the misalignment, "C" is the torque applied to the transmission shaft, "r" is the first distance, and "R" is the radius of the empty central zone:

$$e = \frac{1}{2r^2\left(\frac{Q}{C} - \frac{2r}{r^4 - R^4}\right)}$$

20 Claims, 3 Drawing Sheets

FLEXIBLE DISK, A FLEXIBLE COUPLING PROVIDED WITH SUCH A FLEXIBLE DISK, A MOUNTING FLANGE PROVIDED WITH SUCH A FLEXIBLE COUPLING, AND A TRANSMISSION SHAFT FITTED WITH SUCH A MOUNTING FLANGE

The present invention relates to a flexible disk for connecting a transmission shaft to a mechanical part, e.g. a rotorcraft turbine engine.

BACKGROUND OF THE INVENTION

More particularly, the invention relates to a mounting flange provided at each end of a transmission shaft, each mounting flange being provided with at least one flexible coupling, each coupling comprising two flexible disks.

Consequently, the invention lies in the technical field of transmitting power from one mechanical member to another, and in particular between mechanical members of a rotorcraft.

Most presently-constructed rotorcraft are fitted with at least one free turbine turboshaft engine. Power is then taken from a low pressure stage of the free turbine, which stage is mechanically independent from the compressor assembly and from the high pressure stage of the turbine engine. The free turbine of a turboshaft engine generally rotates at a speed in the range 20,000 revolutions per minute (rpm) to 50,000 rpm, so a rotary speed reducing gearbox is needed for the connection to the main rotor of the rotorcraft since its speed of rotation lies substantially in the range 200 rpm to 400 rpm: this is the main gearbox (MGB).

Under such conditions, the turbine engine is connected to the main gearbox of the rotorcraft via at least one transmission shaft that rotates about its axis of rotation at a speed that is often greater than 5000 rpm.

Similarly, a rotorcraft generally has a tail rotor to compensate for the reaction moment due to mechanically driving the main rotor and serving to enable the rotorcraft to be steered.

Consequently, at least one power transmission shaft is generally arranged between the main gearbox and a tail speed-reducing gearbox for delivering power to the tail rotor. Such a transmission shaft can also be caused to rotate at a speed greater than 5000 rpm.

Given these speeds of rotation, the transmission shaft needs to be securely fastened by mounting flanges to the mechanical members it interconnects.

Furthermore, these mounting flanges must be capable of allowing the transmission shaft to transmit the power developed by one mechanical member to another under conditions that are extreme, specifically when the interconnected members are not in alignment with each other.

In order to combat the vibration generated by rotating assemblies, rotorcraft are provided with anti-vibration devices.

Consequently, the main gearbox, and possibly also the engine of the rotorcraft are fitted with anti-vibration devices. Thus, the gearbox and the engines are potentially free to move relative to the structure of the rotorcraft, in order to limit the vibration they generate.

The transmission shafts arranged between these mechanical members must thus be capable of operating in spite of these movements, in particular vertical movements that give rise to misalignments between the members concerned relative to one another.

Document FR 1 020 765 describes mounting flanges that accommodate that type of misalignment.

The mounting flange comprises a plurality of diaphragms of U-shaped axial section. Each diaphragm comprises two facing vertical elements that are provided with respective circular fasteners.

A first diaphragm, having a vertical element provided with a first circular fastener is then connected to a second diaphragm having a vertical element provided with a second circular fastener, by fastening the first circular fastener to the second circular fastener by means of nuts and bolts.

During movement of a mechanical member that is secured to the mounting flange, e.g. the engine of a rotorcraft, the mounting flange deforms so that the assembly comprising the mechanical member and the transmission shaft does not jam. The engine can then continue to drive the transmission shaft and thus the main gearbox, even in the event of the mechanical members being misaligned.

That mounting flange performs its function well. Nevertheless, it is found that devices making use of that principle sometimes present a lifetime that is limited. It is not unusual to find breaks in the diaphragm, particularly at the boundary between a vertical element and a circular fastener, e.g. after being used for about 8000 hours (h).

Given the cost of each mounting flange, such breaks are therefore expensive and harmful.

Since this drawback appears to be insoluble to the person skilled in the art, it is naturally necessary to make do with a lifetime of 8000 h.

The conventional knowledge of the person skilled in the art does not allow for using the relatively simple technique of increasing the thickness of each vertical element of each diaphragm of the mounting flange for the purpose of avoiding breakage. Increasing the thickness of the vertical element would make it stiffer.

Consequently, the movement of the vertical element would be modified and a fixed mounting flange therefore cannot take the place of the original mounting flange.

BRIEF SUMMARY OF THE INVENTION

An object of the present invention is to provide a flexible disk for use in the coupling means of a mounting flange for connecting a transmission shaft to a mechanical part that makes it possible to overcome the above-mentioned limitations, the flexible disk and the mounting flange presenting a lifetime that is practically without limit and being interchangeable with existing mounting flanges.

According to the invention, a flexible disk serves to connect a transmission shaft in rotation with a mechanical part in spite of the transmission shafts being misaligned relative to the mechanical part, the flexible disk being suitable for performing rotary motion about an axis of rotation and being provided in succession going from its center towards its periphery with an empty central zone, with a circular base, with a transition zone having an outer face and an inner face, and then with a peripheral collar. In addition, the circular base has a shoulder that projects from the flexible disk from the outer face side of the transition zone.

The flexible disk is remarkable the transition zone presents a minimum thickness at the edge of the peripheral collar, this minimum thickness being determined with the help of the following thickness relationship in which "e" represents the thickness of the transition zone at a first distance "r" from said axis of rotation, "Q" is a constant that depends on said misalignment, "C" is the torque applied to said transmission shaft for which the disk needs to be dimensioned, "r" is said first distance, and "R" is the radius of said empty central zone:

$$e = \frac{1}{2r^2\left(\dfrac{Q}{C} - \dfrac{2r}{r^4 - R^4}\right)}$$

The transition zone of the flexible disk then has thickness enabling it to withstand the various stresses to which it will be subjected when in use. The flexible disk thus presents a lifetime that is not limited, since the minimum thickness avoids the flexible disk breaking at the boundary between the transition zone and the peripheral collar.

It might be thought that this thickening would be detrimental to the stiffness of the flexible disk and thus be detrimental to the movement of the peripheral collar. That is at least the reasoning that has been used until now by the person skilled in the art, as mentioned above.

On the contrary, in surprising and completely unexpected manner, the movement of the peripheral collar is not modified.

It is found that the mechanical stress maximum exerted on the flexible disk while it is in use is offset by implementing the invention. This stress is no longer applied at the boundary between the transition zone and the collar, which makes it possible in particular for this boundary to withstand the forces to which it is subjected.

Furthermore, this maximum stress now applies to a portion of the transition zone that is thicker and therefore stronger and does not risk breaking. Nevertheless, this maximum stress induces deformation of the flexible disk leading to movement of the peripheral collar that is identical to the movement that occurs in prior art devices.

By going against the prejudices that exist in the technical field of transmission shaft mounting flanges, the Applicant has thus invented a flexible disk that operates with deformation equal to that of existing disks, while presenting a lifetime that is practically unlimited.

Furthermore, the constant Q depends both on the misalignment and on the speed of rotation of the flexible disk, said constant being taken to lie in the range $10^7$ pascals (Pa) to $10^9$ Pa.

More particularly, the constant Q is equal to the product of the number pi ($\pi$) multiplied by a term that depends on the fatigue limit F of the material of the flexible disk, this product being divided by the square root of the number 3. Thus, with T1 representing said term and * representing the multiplication symbol, the following applies:

$$Q = \frac{\pi * T1}{\sqrt{3}}$$

In a first configuration in which the misalignment is assumed to be zero, the term T1 is equal to the fatigue limit F of the material constituting the flexible disk as determined by the usual methods, e.g. including conventional testing as is well known to the person skilled in the art.

In a second configuration, the term T1 is obtained using the following equation:
where:

$$T1 = F * \sqrt{1 - \left(\frac{\left(\left(\dfrac{6*\pi*E*\alpha*(R_e^4 - R^4)}{2*R_e*(R_e - R_i)^4 *} * \dfrac{(-r^2 + 2*R_i*r-)}{R_e*(2*R_i - R_e)}\right)\right)}{F}\right)^2}$$

F is equal to the fatigue limit F of the material constituting the flexible disk;

C is the torque applied to the transmission shaft for which the disk needs to be dimensioned.

E is Young's modulus of the material constituting the flexible disk;

$\alpha$ represents the misalignment of the shaft provided with the flexible disk;

$R_e$ represents the maximum outer radius of the flexible disk;

R represents the radius of said empty central zone;

$R_i$ represents the minimum outer radius of the circular base; and r represents said first distance.

It should be observed that the maximum outer radius $R_e$ of the flexible disk and the minimum outer radius $R_i$ of the circular base are initial data set by the manufacturer as a function in particular of the space available and the structures that can be used.

The radius R of said empty central zone is determined by the outside radius of the shaft on which the flexible disk is to be installed.

Advantageously, the thickness of the transition zone between the inner face and the outer face is determined solely with the help of said thickness relationship. At any point a longitudinal section (i.e. a section in a plane containing the axis of rotation of the flexible disk) has a thickness that is determined with the help of the above thickness relationship.

In a first embodiment, the transition zone has a symmetrical longitudinal section, the inner and outer faces being disposed symmetrically about a midplane of the disk.

In a second embodiment, the transition zone has an asymmetrical longitudinal section, the inner and outer faces not being disposed symmetrically about a midplane of the disk.

Depending on the particular variants of these embodiments, the outer face of the transition zone may be perpendicular to the axis of rotation or it may be plane and present an angle relative to said axis of rotation.

Similarly, the inner face of the transition zone is possibly perpendicular to the axis of rotation, or it may be plane and present an angle of rotation relative to said axis of rotation.

In addition, it should be observed that it is advantageous for the flexible disk to be made from a very particular steel that is known by the standardized designation "X1CrNiMoAlTi12-9-2" according to the standard EN 10088-1, or under the standardized designation "E-Z1CDAT12.09" according to the AFNOR standard. This very particular steel makes it easy to machine the flexible disk without it being necessary to use machining that is difficult to implement, such as chemical machining, which is both slow and expensive, while also giving the flexible disk the required mechanical properties.

Furthermore, the peripheral collar may present at least two symmetrical passages about said axis of rotation, said passages being opposite in pairs and radial, i.e. being arranged on a diameter of the disk.

The present invention also provides a coupling enabling a transmission shaft to be connected to rotate with a mechanical part in spite of the transmission shaft being misaligned relative to the mechanical part.

This flexible coupling comprises first and second flexible disks of the invention, each flexible disk having an empty central zone, a circular base, a transition zone provided with an inner face and an outer face, and then a peripheral collar.

Thereafter, a first inner facet of the peripheral collar of the first disk is secured to a second inner facet of the peripheral collar of the second disk so that the inner faces of the flexible disk face each other. The flexible disks of a flexible coupling are then connected together via their peripheral collars, e.g. by electron beam welding.

Movement of one flexible disk of the flexible coupling relative to the other then makes it possible in particular to compensate for misalignment between the mechanical members interconnected by the transmission shaft.

Furthermore, this disposition makes it possible to have a fastening with the flexibility of the flexible disks while being sufficiently rigid to enable the required power to be transmitted.

Preferably, the first flexible disk has two opposite passages disposed on a first diameter of the first flexible disk and the second flexible disk has two opposite passages disposed on a second diameter of the second flexible disk, with the passages of the first flexible disk being offset relative to the passages of the second flexible disk. For example, the first diameter may be orthogonal to the second diameter.

These passages are particularly advantageous since they provide the flexible coupling with novel and inventive effects.

It is possible that impurities, e.g. grease, penetrates between the two flexible disks. These impurities can then give rise to unbalance that degrades the balancing of the transmission shaft.

Nevertheless, in the present configuration, these impurities are ejected from the flexible coupling providing they can escape therefrom through the passages under the influence of centrifugal force.

Furthermore, and surprisingly, the passages make the flexible coupling safer. It is recalled that the peripheral collars can be secured to each other by welding. If the welding fails at some location, the propagation of the resulting crack is stopped by the passages. Thus, these passages prevent the first and second flexible disks of the coupling from separating completely.

The present invention also provides a mounting flange enabling a transmission shaft to be connected to rotate a mechanical part in sprite of the transmission shaft being misaligned relative to the mechanical part.

Depending on the stresses exerted on the mounting flange, the mounting flange comprises at least first and second flexible couplings of the invention.

The circular base of a flexible disk of the first coupling is then secured to the circular base of a flexible disk of the second flexible coupling so as to constitute the mounting flange.

The invention also provides a transmission shaft having first and second ends, each of the first and second ends being fitted with a respective mounting flange that comprises at least one flexible coupling having first and second flexible disks of the invention.

Furthermore, the invention also provides a method of fabricating a flexible disk enabling a transmission shaft to be connected in rotation with a mechanical part in spite of misalignment between said transmission shaft and said mechanical part, said flexible disk being suitable for performing rotary motion about an axis of rotation and being provided in succession going from its center towards its periphery with an empty central zone, a circular base, with a transition zone having an outer face and an inner face, and then with a peripheral collar, said circular base having a shoulder that projects from said flexible disk from the outer face side of said transition zone. Said transition zone presents a minimum thickness at the edge of said peripheral collar, said minimum thickness being determined with the help of the following thickness relationship, where (e) represents the thickness of the transition zone at a first distance (r) from said axis of rotation, (Q) is a constant depending on said misalignment, (C) represents the torque to be applied to said transmission shaft for which the disk needs to be dimensioned, (r) represents said first distance, and (R) represents the radius of said empty central zone:

$$e = \frac{1}{2r^2\left(\frac{Q}{C} - \frac{2r}{r^4 - R^4}\right)}$$

Optionally, the constant Q is equal to the product of the number pi ($\pi$) multiplied by a term that depends on the fatigue limit F of the material of the flexible disk, this product being divided by the square root of the number 3. Thus, with T1 representing said term and * representing the multiplication symbol, this gives:

$$Q = \frac{\pi * T1}{\sqrt{3}}$$

In a first configuration, the term T1 is equal to the fatigue limit F of the material constituting the flexible disk, as determined by the usual methods, including for example conventional testing, as is well known to the person skilled in the art.

In a second configuration, the term T1 is obtained with the help of the following equation:

$$T1 = F * \sqrt{1 - \left(\frac{\left(\left(\frac{6*\pi*E*\alpha*(R_e^4 - R^4)}{2*R_e*(R_e - R_i)^4 *} * \frac{(-r^2 + 2*R_i*r-)}{R_e*(2*R_i - R_e))}\right)^2\right.}{F}\right.}$$

where:
F is equal to the fatigue limit F of the material constituting the flexible disk;
C is the torque applied to the transmission shaft for which the disk needs to be dimensioned.
E is Young's modulus of the material constituting the flexible disk;
$\alpha$ represents the misalignment of the shaft provided with the flexible disk;
$R_e$ represents the maximum outer radius of the flexible disk, which is given from the manufacter;
R represents the radius of said empty central zone;
$R_i$ represents the minimum outer radius of the circular base, which is a given from the manufacturer; and
r represents said first distance.

Furthermore, the flexible disk is machined so as to present one or more of the claimed characteristics described above.

BRIEF DESCRIPTION OF THE DRAWINGS

The invention and its advantages appear in greater detail from the following description of embodiments given by way of illustration and with reference to the accompanying figures, in which.

Elements that are present in more than one of the figures are given the same references in all of them.

DETAILED DESCRIPTION

Figure 1:
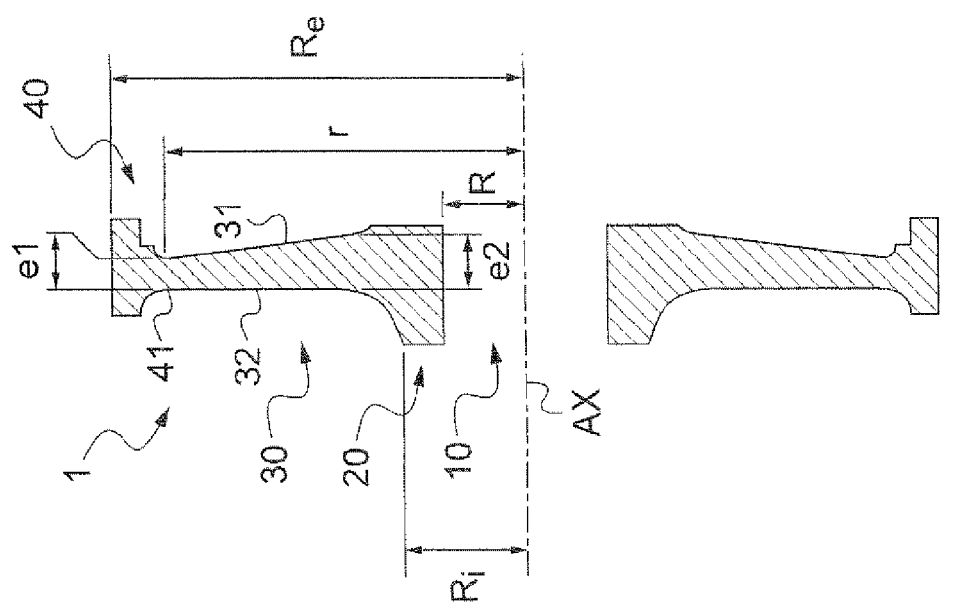
FIG. 1 is a section view of a flexible disk constituting a first variant of the second embodiment.

FIG. 1 is a section view of a flexible disk constituting a first variant of the second embodiment.

The flexible disk 1 is designed to provide a connection between two rotary mechanical members, for example a transmission shaft and a turbine engine in a rotorcraft. The mounting flange including the flexible disk 1 needs to allow two mechanical members to rotate under conditions that are extreme, including a situation in which the mechanical members are not properly in alignment relative to each other.

Consequently, it is necessary for the mounting flange to be sufficiently flexible to compensate for misalignment and sufficiently rigid to be able to withstand high levels of mechanical force, such as, in particular, the torque that is exerted on the mounting flange.

Furthermore, the flexible disk 1 that is to perform rotary motion about the axis of rotation AX, which also constitutes its axis of symmetry AX, comprises in succession in a radial direction: a empty central zone 10, a circular base 20, a transition zone 30 of tapering thickness, and then a peripheral collar 40.

It should be observed that in certain known models the portion of the transition zone that is at the edge 41 of the peripheral collar 40 is particularly sensitive and presents risks of rupture, starting from a medium lifetime.

Consequently, the transition zone 30 presents a minimum thickness e1 at the edge 41 of the peripheral collar 40, which thickness is determined with the help of the following thickness relationship in which e represents the thickness of the transition zone at a first distance r from said axis of rotation, Q is a constant that depends on said misalignment, C represents the torque applied to said transmission shaft, r represents said first distance, and R is the radius of said empty central zone:

$$e = \frac{1}{2r^2\left(\frac{Q}{C} - \frac{2r}{r^4 - R^4}\right)}$$

It should be observed that the torque C is completely defined insofar as it corresponds to the torque that can be accepted by said transmission shaft, and consequently to the torque that is applied to said transmission shaft while it is in use.

The constant Q thus depends on the maximum misalignment that is acceptable between the mechanical members to be connected together, said constant Q advantageously lying in the range $10^7$ Pa to $10^9$ Pa.

More particularly, the constant Q is equal to the product of the number pi ($\pi$) multiplied by a term that depends on the fatigue limit F of the material of the flexible disk, with this product being divided by the square root of the number 3. Thus, for T1 representing said term, and * representing the multiplication symbol, this gives:

$$Q = \frac{\pi * T1}{\sqrt{3}}$$

In a first configuration, the term T1 is equal to the fatigue limit F of the material constituting the flexible disk, as determined by the usual methods, including for example conventional testing well known to the person skilled in the art.

In a second configuration, for a flexible disk having a maximum outer radius $R_e$ for the flexible disk and a minimum outer radius $R_i$ for the circular base, and a radius R for the empty central zone that are all constant, the term T1 is obtained with the help of the following equation:

$$T1 = F * \sqrt{1 - \left(\frac{\left(\frac{6*\pi*E*\alpha*(R_e^4 - R^4)}{2*R_e*(R_e - R_i)^4 *} * \frac{(-r^2 + 2*R_i*r-)}{R_e*(2*R_i - R_e))}\right)^2}{\left(\frac{\pi*F}{\sqrt{3}*C}*(R_e^4 - R^4) - 2*R_e\right)}\right)}$$

where:

F is equal to the fatigue limit F of the material constituting the flexible disk;

C is the torque applied to the transmission shaft for which the disk needs to be dimensioned.

E is Young's modulus of the material constituting the flexible disk;

$\alpha$ represents the misalignment of the shaft provided with the flexible disk;

$R_e$ represents the maximum outer radius of the flexible disk;

R represents the radius of said empty central zone;

$R_i$ represents the minimum outer radius of the circular base; and r represents said first distance.

Under these conditions and in accordance with the method implemented by the invention, the minimum thickness e1 is determined from the transition zone 30 to the edge 41 of the peripheral collar 40 using the thickness relationship mentioned above.

Like the torque C, the angle $\alpha$ is known insofar as the disk is made for a particular application, i.e. a shaft that is to convey a torque C with a misalignment $\alpha$.

Thus, a particular flexible disk will have a minimum thickness e1 equal to 0.5 millimeters (mm) when the radius R of the empty central zone 10 is equal to 29 mm when the edge 41 of the peripheral collar is at a first distance r from the axis of rotation AX, and thus from the center of the flexible disk 1, that is equal to 52 mm. Likewise, the ratio Q/C used in the thickness relationship is then equal to 0.447.

Furthermore, in the second embodiment, the transition zone 30 has a longitudinal section that is asymmetrical. This zone has an inner face 31 and an outer face 32, these inner and outer faces 31 and 32 not being symmetrical relative to each other.

Nevertheless, in a first embodiment (not shown), the transition zone 30 has a longitudinal section that is symmetrical.

Furthermore, in the variant of the second embodiment shown in FIG. 1, the thickness of the transition zone is defined with the help of the thickness relationship only in the vicinity of the edge 41.

The outer face 32 of the transition zone is then plane and perpendicular to the axis of rotation AX.

In contrast, the inner face 31 presents an angle relative to said axis of rotation. The maximum thickness e2 of the transition zone 30 is then at the boundary between said transition zone 30 and the circular base 20, this maximum thickness e2 advantageously being one millimeter when the minimum thickness e1 is equal to 0.5 mm.

Nevertheless, depending on requirements, the transition zone could present some other profile, all such profiles having in common the required minimum thickness at the edge 41 of the transition zone 30, said thickness being determined with the help of said thickness relationship.

Figure 2:
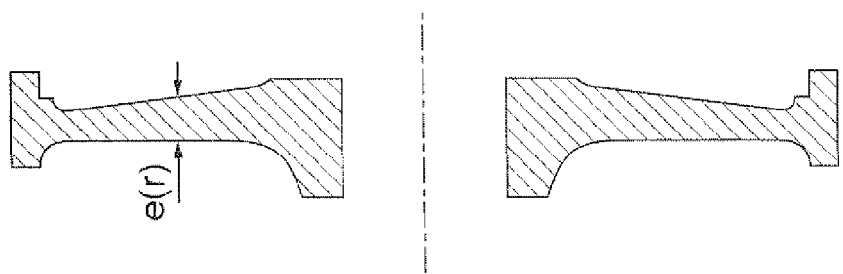
FIG. 2 is a section view of a flexible disk constituting a second variant of the second embodiment.

With reference to FIG. 2, in another variant of the second embodiment, the thickness of the transition zone e(r) is determined at any radius with the help of the thickness relationship of the invention.

Figure 3:
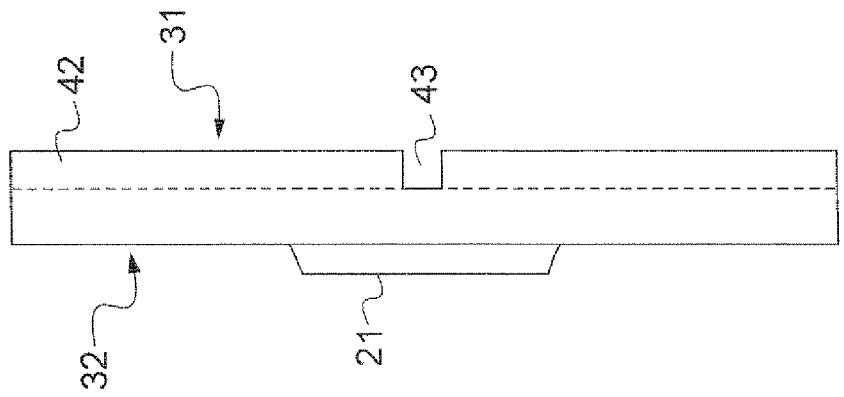
FIG. 3 is an edge view of a flexible disk.

FIG. 3 is an edge view of a flexible disk.

Whatever the embodiment selected, it should be observed that the circular base includes a shoulder 21 that projects from the flexible disk on the same side as the outer face 32 of the transition zone 30.

Similarly, the peripheral collar 40 is provided with a portion 42 that projects from the flexible disk on the same side as the inner face 31 of the transition zone 30.

It can be seen below that this shoulder 21 and these projecting portions 42 enable a flexible disk to be connected to another flexible disk.

Furthermore, it should be observed that the peripheral collar is provided with through passages 43.

Figure 4:
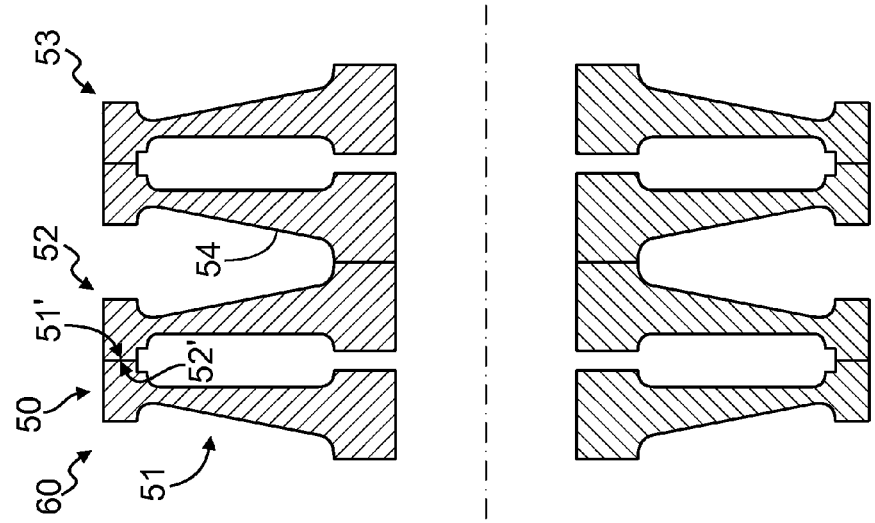
FIG. 4 is a section view of a mounting flange provided with two flexible couplings.

FIG. 4 is a section through a mounting flange 60 comprising two flexible couplings.

The mounting flange between the transmission shaft and a rotary mechanical member needs to be simultaneously flexible and based on a plane, while also being rigid about the axis of rotation AX.

Consequently, depending on the forces to be transmitted from the mechanical member to the transmission shaft, it might be necessary to use a plurality of flexible disks, e.g. four as shown in FIG. 4.

The flexible disks are then connected together in pairs, each pair of flexible disks constituting a flexible coupling 50.

Each flexible coupling is thus provided with first and second flexible disks 51 and 52, these first and second disks being secured to each other via their peripheral collars.

More precisely, the inner facet 51' of the projecting portion of the peripheral collar of the first disk 51 is secured to the inner facet 52' of the projecting portion of the peripheral collar of the second disk 52.

Advantageously, the connection is made by electron beam welding. Consequently, a beam of electrons is concentrated on the facets that are to be assembled together, thereby heating them. Locally, the material constituting the inner facets 51' and 52' is observed to evaporate, thereby forming a cavity in which the welding takes place.

Furthermore, when a plurality of flexible couplings are needed, the projecting shoulder of the circular base of a flexible disk 52 belonging to a first flexible coupling is secured to the projecting shoulder of the circular base of a flexible disk 54 belonging to a second flexible coupling 53, e.g. by using electron beam welding.

The resulting mounting flange 60 is then disposed at the end of a transmission shaft.

Figure 5:
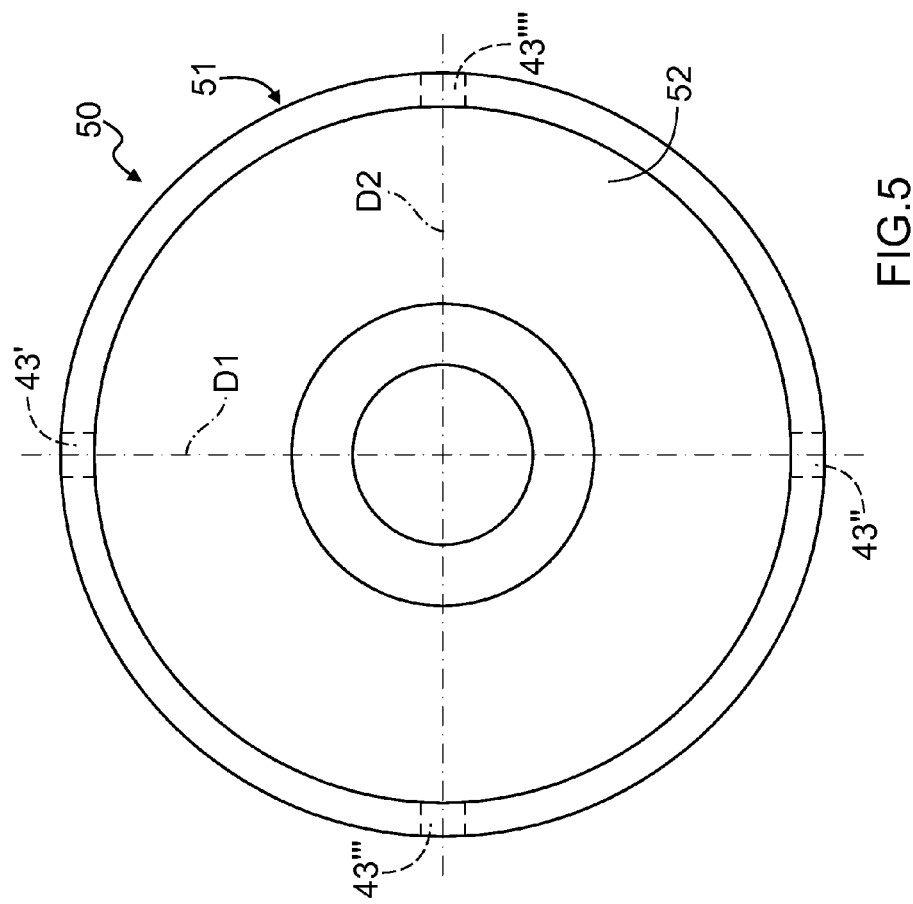
FIG. 5 is a diagrammatic face view of a flexible coupling.

FIG. 5 is a diagrammatic face view of a coupling 50 provided with first and second flexible disks 51 and 52.

The peripheral collar of the first flexible disk 51 has two diametrically opposite passages 43' and 43". These passages 43' and 43" are thus both located on a first diameter D1 of the first flexible disk 51.

Similarly, the peripheral collar of the second flexible disk 52 has two opposite passages 43''' and 43''''. These passages 43''' and 43'''' are then both disposed on a second diameter D2 of the second flexible disk 52.

Advantageously, when securing the first flexible disk 51 to the second flexible disk 52, the passages 43' and 43" of the first flexible disk 51 are offset relative to the passages 43''' and 43'''' of the second flexible disk 52.

Figure 6:
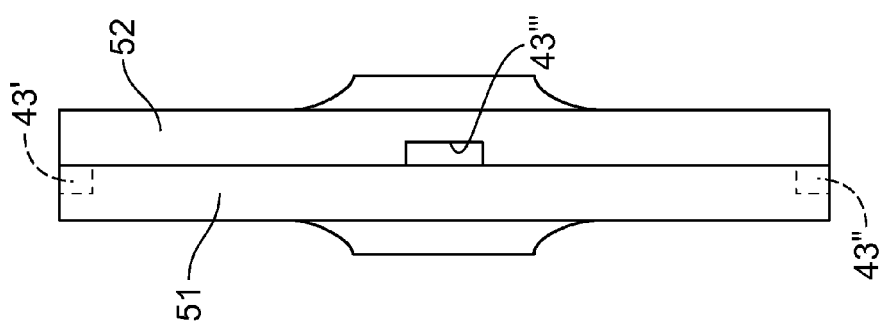
FIG. 6 is a side view of the flexible coupling of FIG. 5.

In the example shown in FIGS. 5 and 6, the first diameter D1 is thus orthogonal to the second diameter D2.

Thus, the passages in the first disk 51 are not in register with the passages of the second disk 52.

Unexpectedly, this characteristic makes it easier to secure the first flexible disk against the second flexible disk when this is done by means of welding.

Each passage has a given width, e.g. 0.5 mm. In order to obtain such a passage, which is itself innovative, the person skilled in the art would make an opening in the first disk.

Thereafter, the person skilled in the art would put that opening into register with another opening formed in the second disk, with each opening thus having a smaller width equivalent to half the given width, i.e. 0.25 mm, so that the passage thus made in the coupling has the desired given width.

Unfortunately, by proceeding in that way, it is found that the electron beam used for performing the welding actually ends up by closing the passage.

In contrast, surprisingly, this closing does not occur with the invention. By making an opening of the given width in one disk and by not placing said opening in register with an opening in the second disk, the passage that is obtained is not plugged by welding, even when it has the same dimensions as in the above circumstances.

Similarly, if the welding cracks, the resulting crack is stopped at a passage and thereby prevented from propagating around the entire circumference of the peripheral collars of the first and second flexible disks 51 and 52.

In addition, by applying the invention, four passages 43', 43", 43''', and 43'''' are obtained in the coupling 50 while making only two passages 43' & 43", 43''' & 43'''' in each of the flexible disks instead of four as would be made with the above-mentioned natural technique, thereby achieving a saving in time and enabling production costs to be reduced.

Furthermore, the passages serve to prevent condensation effects occurring inside the coupling or indeed to prevent impurities such as grease becoming deposited therein, since such impurities are naturally expelled through the passages 43', 43", 43''', and 43'''' during the rotary motion of the flexible coupling 50.

Naturally, the present invention can be varied in numerous ways as to its implementation. Although several embodiments are described above, it will readily be understood that it is not conceivable to identify exhaustively all possible embodiments. It is naturally possible to envisage replacing any of the means described by equivalent means without thereby going beyond the ambit of the present invention.

For example, the mounting flange shown in FIG. 4 presents two couplings. Nevertheless, depending on requirements, it is possible to envisage reducing or even increasing the number of couplings in a mounting flange.

Similarly, it is possible to envisage arranging a mounting flange that is provided with two couplings on one end of a transmission shaft and to provide a mounting flange that is provided with only one coupling at the other ends, for example.

What is claimed is:

1. A flexible disk enabling a transmission shaft to be connected in rotation with a mechanical part in spite of misalignment between said transmission shaft and said mechanical part, said flexible disk being suitable for forming rotary motion about an axis of rotation and being provided in succession going from its center towards its periphery with an empty central zone, with a circular base, with a transition zone having an outer face and an inner face, and then with a peripheral collar, said circular base having a shoulder that projects from said flexible disk from the outer face side of said transition zone;

wherein said transition zone presents a minimum thickness at the edge of said peripheral collar, said minimum thickness being determined with the help of the following thickness relationship, where (e) represents the thickness of the transition zone at a first distance (r) from said axis of rotation, (Q) is a constant depending on said misalignment, (C) represents the torque to be applied to said transmission shaft for which the disk needs to be dimensioned, (r) represents said first distance, and (R) represents the radius of said empty central zone:

$$e = \frac{1}{2r^2\left(\frac{Q}{C} - \frac{2r}{r^4 - R^4}\right)}.$$

2. A flexible disk according to claim 1, wherein said constant (Q) lies in the range $10^7$ Pa to $10^9$ Pa.

3. A flexible disk according to claim 1, wherein said transition zone has a maximum thickness equal to one millimeter.

4. A flexible disk according to claim 1, wherein the thickness of said transition zone between said inner face and said outer face is determined solely with the help of said thickness relationship.

5. A flexible disk according to claim 1, wherein said transition zone has a longitudinal section that is asymmetrical.

6. A flexible disk according to claim 1, wherein said outer face is perpendicular to said axis of rotation.

7. A flexible disk according to claim 1, wherein said inner face is perpendicular to said axis of rotation.

8. A flexible disk according to claim 1, wherein said transition zone has a longitudinal section that is symmetrical, said inner and outer faces being disposed symmetrically about a midplane of said flexible disk.

9. A flexible disk according to claim 1, wherein said inner face is planar and presents an angle relative to said axis of rotation.

10. A flexible disk according to claim 1, wherein said outer face is planar and presents an angle relative to said axis of rotation.

11. A flexible disk according to claim 1, wherein said flexible disk is made of a steel having the standardized designation "X1CrNiMoAlTi12-9-2" in the standard EN 10088-1.

12. A flexible disk according to claim 1, wherein said peripheral collar presents at least two passages that are symmetrical about said axis of rotation, said passages being opposite and arranged on a diameter of the flexible disk.

13. A flexible coupling for providing a rotary connection between a transmission shaft and a mechanical part in spite of misalignment of the transmission shaft relative to the mechanical part, said flexible coupling comprising first and second flexible disks according to claim 1, each flexible disk having an empty central zone, a circular base, a transition zone having an inner face and an outer face, and then a peripheral collar, a first inner facet of the peripheral collar of the first disk being secured to a second inner facet of the peripheral collar of the second disk so that the inner faces of said flexible disks face each other.

14. A flexible coupling according to claim 13, wherein the first flexible disk includes two opposite passages arranged on a first diameter (D1) of said first flexible disk, the second flexible disk having two opposite passages disposed on a second diameter (D2) of said second flexible disk, the passages of said first flexible disk being offset relative to the passages of said second flexible disk, wherein the passages of the first disk are not in register with the passages of the second disk.

15. A flexible coupling according to claim 13, wherein the first flexible disk has two opposite passages disposed on a first diameter (D1) of said first flexible disk, the second flexible disk has two opposite passages disposed on a second diameter (D2) of said second flexible disk, said first diameter (D1) being orthogonal to said second diameter (D2), wherein the passages of the first disk are not in register with the passages of the second disk.

16. A mounting flange for providing a rotary connection between a transmission shaft and a mechanical part in spite of misalignment of said transmission shaft relative to said mechanical part, the mounting flange including at least one flexible coupling according to claim 13.

17. A mounting flange according to claim 16, said mounting flange comprising first and second flexible couplings, the circular base of a flexible disk of the first flexible coupling being secured to the circular base of a flexible disk of the second flexible coupling.

18. A transmission shaft provided with first and second ends, wherein each of said first and second ends is provided with a mounting flange according to claim 16.

19. A method of fabricating a flexible coupling comprising:
forming a first flexible disk according to claim 1;
forming a second flexible disk according to claim 1; and
connecting the first disk to the second disk.

20. The method of claim 19 further comprising:
forming a passage in the first disk;
forming a passage in the second disk; and
orienting the passage in the first disk and the passage in the second disk such that the passages are offset from one another.

* * * * *